(12) United States Patent  (10) Patent No.: US 7,287,866 B2
Yamamoto et al.  (45) Date of Patent: Oct. 30, 2007

(54) VIDEO PROJECTION APPARATUS

(75) Inventors: Akira Yamamoto, Yokohama (JP);
Shuichi Kobayashi, Yokohama (JP);
Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/490,138

(22) Filed: Jul. 21, 2006

(65) Prior Publication Data

US 2006/0262286 A1  Nov. 23, 2006

Related U.S. Application Data

(62) Division of application No. 11/010,276, filed on Dec. 14, 2004, now Pat. No. 7,118,231.

(30) Foreign Application Priority Data

Dec. 22, 2003  (JP) ............................. 2003-425568

(51) Int. Cl.
*G03B 21/14*  (2006.01)
(52) U.S. Cl. .......................................... 353/119; 349/5
(58) Field of Classification Search ............... 353/119, 353/DIG. 3, DIG. 4, 69, 70, 63, 65, 66, 79, 353/101; 349/5, 6, 7
See application file for complete search history.

(56) References Cited

U.S. PATENT DOCUMENTS 5,090,800 A * 2/1992 Ushiro ........................ 353/71
5,642,927 A  7/1997 Booth et al. ................. 353/119
5,876,105 A  3/1999 Rodriguez, Jr. .............. 353/119
6,712,475 B2  3/2004 Davis et al. ................. 353/119
6,783,243 B2  8/2004 Bellander ...................... 353/20
7,118,231 B2 * 10/2006 Yamamoto et al. ......... 353/119
2005/0030494 A1  2/2005 Kumai ........................ 353/119

FOREIGN PATENT DOCUMENTS

| JP | 6-82765 | 3/1994 |
| JP | 10-260473 | 9/1998 |
| JP | 2003-29182 | 1/2003 |

* cited by examiner

*Primary Examiner*—William C. Dowling
(74) *Attorney, Agent, or Firm*—Fitzpatrick, Cella, Harper & Scinto

(57) ABSTRACT

An image projection apparatus according to the present invention includes: a light modulation system; a projection optical system for projecting a two-dimensional image onto a surface to be projected with light from the light modulation system; an image signal processing unit for supplying an image signal to the light modulation system; a power supplying portion for supplying power to the light modulation system; a head portion that contains the projection optical system; a main body portion that contains the power supplying portion; and a drive connection portion for connecting the head portion with the main body portion, in which the head portion and the main body portion can be relatively driven.

10 Claims, 7 Drawing Sheets

VIDEO PROJECTION APPARATUS

This is a division of application Ser. No. 11/010,276, filed on Dec. 14, 2004 now U.S. Pat. No. 7,118,231.

BACKGROUND OF THE INVENTION

1. Field of the Invention

The present invention relates to a video projection apparatus for projecting a video to a wall surface, a screen surface, or the like, and more particularly to a video projection apparatus which employs a structure in which a projection direction of the video can be easily changed to an arbitrary direction, a size of the entire apparatus is small, and portability is superior.

2. Related Background Art

Up to now, in a video projection apparatus such as a liquid crystal projector, a video based on a video signal inputted from the outside or a video stored in an internal memory (video storing means) is enlargedly projected onto a screen surface. A video projection apparatus which employs a structure in which a video displayed on a small video display means such as a liquid crystal panel is illuminated with a light flux from a light source means for emitting intense light to enlargedly project the video to a large imaging area such as a screen has been known as such a video projection apparatus (Japanese Patent Application Laid-open No. H10-260473 or Japanese Patent Application Laid-open No. H06-082765).

A scanning projection display apparatus for projecting a light beam onto a predetermined surface using a scanning optical system to display a video has been also known (Japanese Patent Application Laid-open No. 2003-029182).

According to the video projection apparatus disclosed in Japanese Patent Application Laid-open No. H10-260473, a video is displayed on the liquid crystal display panel based on a video signal inputted from the outside. A light flux from the liquid crystal display panel illuminated with a light flux from the light source means is projected to a screen provided in a predetermined direction by a projection lens through a mirror provided in a pivotable cover member.

According to Japanese Patent Application Laid-open No. H06-082765, disclosed is a liquid crystal projector whose projection main body can be set at various angles by using a leg part relative to an adapter to project a video in an arbitrary direction.

According to the scanning projection display apparatus disclosed in Japanese Patent Application Laid-open No. 2003-029182, a resonance type mirror and a galvanomirror are used for a scanning means. A scanning member in a horizontal direction is driven with a sine wave for two-dimensional scanning to project a video.

In general, the video projection apparatus is large in size and heavy, so that the projection direction of the video is substantially determined. According to Japanese Patent Application Laid-open No. H06-082765, for example, a base for changing the projection direction is fit onto a main body, thereby changing the video projection direction. Although the projection direction can be changed in such a manner, the amount of change is small. Therefore, for example, it is hard to change the projection direction from the ceiling of a room to the wall surface thereof. A size of the apparatus itself is likely to increase because the base is fit.

According to Japanese Patent Application Laid-open No. H10-260473, a mirror is located in an exit port of the video as a means for changing the projection direction of the video without the movement of the video projection apparatus itself, thereby changing the projection direction. When the projection direction is intended to significantly change using a method of locating the mirror, a size of the mirror becomes very large, with the result that a size of the apparatus increases. When the method of locating the mirror is used, a changeable projection direction is limited to only a single direction.

SUMMARY OF THE INVENTION

An object of the present invention is to provide a video projection apparatus capable of easily projecting a video in an arbitrary direction.

According to one aspect of the invention, an image projection apparatus includes:

a light modulation system;

a projection optical system for projecting a two-dimensional image onto a surface to be projected with light from the light modulation system;

image signal processing means for supplying an image signal to the light modulation system;

a power supplying portion for supplying power to the light modulation system;

a head portion that contains the projection optical system;

a main body portion that contains the power supplying portion; and a drive connection portion for connecting the head portion with the main body portion, in which the head portion and the main body portion can be relatively driven.

In further aspect of the apparatus, the drive connection portion connects the head portion with the main body portion such that the head portion and the main body portion are relatively rotatable.

In further aspect of the apparatus, the drive connection portion causes the head portion and the main body portion to be rotatable about a first rotational axis and a second rotational axis different from the first rotational axis.

In further aspect of the apparatus, the apparatus further includes a cable portion for electrically connecting the head portion with the main body portion.

In further aspect of the apparatus, the light modulation system includes a light source and at least one image forming element illuminated with light from the light source.

In further aspect of the apparatus, the at least one image forming element includes a plurality of pixels which are arranged in one of a two-dimensional form and a one-dimensional form.

In further aspect of the apparatus, the light modulation system includes a light source for emitting light with directivity, and the image projection apparatus further includes scanning means for scanning the surface to be projected with the light from the light source.

In further aspect of the apparatus, the scanning means includes one of a scanning portion including a mirror capable of two-dimensionally scanning the surface to be projected with the light from the light source and a scanning portion including two mirrors capable of scanning the surface to be projected in directions substantially orthogonal to each other.

In further aspect of the apparatus, the apparatus further includes means for storing at least one of an image and an image signal which is sent to the image signal processing means.

In further aspect of the apparatus, the apparatus further includes rotational angle detecting means for detecting a relative angle between the head portion and the main body portion.

In further aspect of the apparatus, the apparatus further includes distortion amount reducing means for reducing an amount of distortion of the image projected onto the surface to be projected based on a result of detection of the rotational angle detecting means.

In further aspect of the apparatus, the distortion includes keystone distortion.

In further aspect of the apparatus, the apparatus further includes distortion amount reducing means for detecting an angle between an optical axis of the projection optical system and the surface to be projected and reducing a distortion amount of the image projected onto the surface to be projected based on a result of the detection of the angle.

In further aspect of the apparatus, provided that a length of the head portion based on a rotational axis of the drive connection portion in a direction orthogonal to the rotational axis of the drive connection portion is represented by L1, a distance between a center of gravity of the head portion and the rotational axis is 0.2 L1 or larger and 0.45 L1 or smaller.

In further aspect of the apparatus, the distance between the center of gravity of the head portion and the rotational axis is 0.3 L1 or larger and 0.4 L1 or smaller.

In further aspect of the apparatus, provided that a length of the head portion in a longitudinal direction thereof is represented by L1, a distance between a center of gravity of the head portion and the drive connection portion is 0.2 L1 or larger and 0.45 L1 or smaller.

In further aspect of the apparatus, the distance between the center of gravity of the head portion and the drive connection portion is 0.3 L1 or larger and 0.4 L1 or smaller.

In further aspect of the apparatus, provided that a weight of the head portion and a weight of the main body portion are represented by W1 and W2, respectively, the following conditional expression is satisfied:

$$1.5 < W2/W1 < 3$$

DESCRIPTION OF THE PREFERRED EMBODIMENTS

Figure 1:
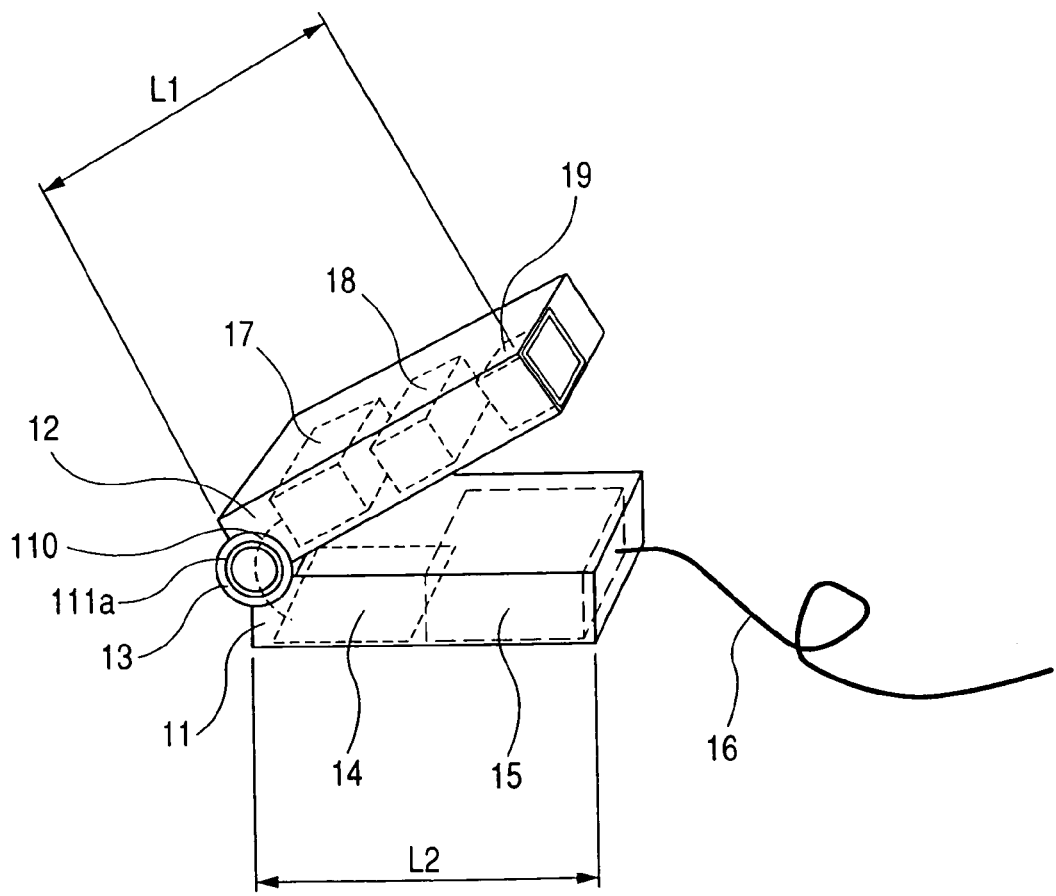
FIG. 1 is a principal part schematic view showing a first embodiment of the present invention.

An image projection apparatus according to an embodiment of the present invention include a light modulation system, a projection optical system for projecting a two-dimensional image onto a surface to be projected with light from the light modulation system, image signal processing means for supplying an image signal to the light modulation system, a power supplying portion for supplying power to the light modulation system, a head portion that contains the projection optical system, a main body portion that contains the power supplying portion, and a drive connection portion for connecting the head portion with the main body portion such that the head portion and the main body portion can be relatively driven. Here, it is desirable that the light modulation system include a light source for emitting light having directivity (such as a laser light source) (For the light source, it is possible to use plurality of light sources or laser light sources each of which emits light having corresponding wave length region different from others, e.g., red, green and blue lights. In case of using a plurality of light sources, a color combining system for combining optical paths of those light into one optical path, which consists of a dichroic mirror, a dichroic prism, a polarization beam splitter and the like are necessary. Furthermore, the number of light source is not only one or three, but also two, four or more than four.), adjustment means for adjusting, for example, the amount of light emitted from the light source based on an image signal, and scanning means for two-dimensionally scanning a surface to be scanned, such as a screen with the light from the light source, as described later. The light modulation system may be composed of an image forming element such as a liquid crystal panel in which a plurality of pixels are one-dimensionally or two-dimensionally arranged and illumination means for illuminating the image forming element. When the plurality of pixels are one-dimensionally arranged, scanning means for scanning the surface to be projected with light from the pixels is required.

In the image (video) projection apparatus, a head portion that contains the projection optical system and a main body portion that contains the power supplying portion are connected with each other through drive connection portion. The drive connection portion is a member for connecting the head portion with the main body portion in a state in which the head portion and the main body portion can be relatively driven. Here, the drive connection portion is a member for connecting the head portion with the main body portion such that the head portion and the main body portion are relatively rotatable. When a relative angle between the head portion and the main body portion is changed, there is an effect that a projection position of an image projected by the projection optical system can be changed. In addition, because the head portion and the main body portion are relatively rotatable, the head portion and the main body portion are rotated so as to be closest to each other and/or to become substantially parallel to each other. Thus, the entire image projection apparatus can be made compact (can be housed in a cubic case having a smaller volume), so that it is easily carried.

Hereinafter, video projection apparatuses according to embodiments of the present invention will be described with reference to the accompanying respective drawings.

First Embodiment

FIG. 1 is a principal part perspective view showing a video projection apparatus according to a first embodiment of the present invention.

In the first embodiment, the video projection apparatus includes a first portion 12 (hereinafter referred to as a head portion) that contains a light source means 17, a video display means 18, and a projection optical system 19, a second portion (hereinafter referred to as a main body) 11 that contains a video signal processing circuit (video signal processing means) 14 and a power source means (power supplying means) 15, and a pivot connection portion 13 serving as a connection means for joining the first and second portions 11 and 12 together. The video display means 18 is, for example, a transmission liquid crystal panel, a reflection liquid crystal panel, or an image forming device such as a digital micro-mirror device (DMD), in which a plurality of pixels are two-dimensionally or one-dimensionally arranged. Here, the number of video display means may be one. It is desirable to use video display means respectively corresponding to three colors of red (R), green (G), and blue (B), that is, three video display means. The pivot connection portion 13 has a function for holding the head portion 12 and the main body 11 which are pivotable relative to each other.

The power source means 15 may be constructed such that power is supplied from the outside through a power source cable 16. Alternatively, the power source means 15 may be constructed to be capable of storing power in advance.

In the head portion 12, the video display means (image forming device) 18 that forms a video (that modulates light so as to form a video) is illuminated with light from the light source means 17. The video is projected onto an arbitrary surface to be projected, for example, a screen surface through the projection optical system 19. The light source means and the video display means may be assumed to compose a light source having directivity (for example, a laser light source) and the projection optical system may be replaced by a scanning optical system for two-dimensionally scanning the surface to be projected with light from the light source. Of course, the number of light sources having directivity may be one. It is desirable to use light sources respectively corresponding to three colors of R, G, and B, that is, at least three light sources.

The pivot connection portion 13 is rotatable only in a single direction. A state in which the main body 11 and the head portion 12 are folded is set to 0 degree. The pivot connection portion 13 is rotated between 0 degree to 180 degrees to change a positional relationship between the main body 11 and the head portion 12. A rotational angle during the rotation is detected by a rotational angle detecting means 111a provided in the pivot connection portion 13. Respective functions are reset in response to a signal obtained by the rotational angle detecting means 111a at a time when the head portion 12 is overlaid on the main body 11. A cable 110 is buried in the pivot connection portion 13 and used to supply the power from the power source means 15 and the video signal from the video signal processing circuit 14 to the video display means 18 and the light source means 17. A flexible cable or a flat cable is used as the cable 110.

The main body 11 contains the video signal processing circuit 14 and the power source means 15. In view of stability of the entire apparatus, a total weight of the main body 11 is desirably about 1.5 times to 3 times larger than a weight of the entire head portion 12. The weight of the main body 11 is preferably 2 times or more, further preferably 2.4 times or more. The video signal processing circuit 14 performs signal processing for displaying on the video display means 18 a video output signal inputted from, for example, a personal computer serving as a video input means. The inputted signal is not limited to the video signal from the personal computer and thus may be a video signal from, for example, a DVD drive, a VTR, or a TV set. The inputted signal may be a video signal or video data which is stored in a memory means provided in the video projection apparatus.

For example, an AC/DC converter is applied to the power source means 15. The AC/DC converter receives an AC current (100 V, 50 Hz or 60 Hz) from a home outlet through the cable 16 and converts the AC current into a DC current which can be used for the video signal processing circuit 14, the video display means 18, the light source means 17, and the like. In this embodiment, the AC/DC converter may be fit to the outside of the main body 11 and only a power source connector for power supply may be provided in the main body 11. The power source means 15 may be a battery (non-rechargeable battery or rechargeable battery) in addition to a power source for supplying power obtained from the outside. Therefore, when the power source means 15 and the video signal processing circuit 14 are incorporated in the main body 11, a size and weight of the head portion 12 reduces, so that the head portion 12 is easy to drive. Note that the power source means 15 supplies power to the light source means, the video signal processing circuit (image signal processing means), a drive system for a projection optical system in the case where the projection optical system in which optical elements are driven is incorporated, and various warning lamps (such as warning lamps used to indicate battery exhaustion and a signal processing error, a transfer error of an image signal, or a correction error displayed in the case where keystone distortion cannot be corrected). Of course, the power source means 15 also supplies power to the rotational angle detecting means 111a. Of course, power may be also supplied to others.

In view of safety, the center of gravity of the head portion 12 is positioned close to the pivot connection portion 13 if possible. As shown in FIG. 1, assume that the rotational axis of the pivot connection portion 13 is set as a reference and a length of the head portion 12 from the rotational axis of the pivot connection portion 13 in a direction orthogonal to the rotational axis of the pivot connection portion 13 is represented by L1. In such a case, the center of gravity is preferably set in a range of 0.2 L1 to 0.45 L1 (more preferably, 0.3 L1 to 0.45 L1 or 0.3 L1 to 0.4 L1).

On the other hand, in view of stability of the entire apparatus in the projection state, the center of gravity of the main body 11 is set in a range of 0.4 L2 to 0.6 L2, where L2 is a length of the main body 11 from the rotational axis of the pivot connection portion 13 in a direction orthogonal to the rotational axis of the pivot connection portion 13.

Figure 2:
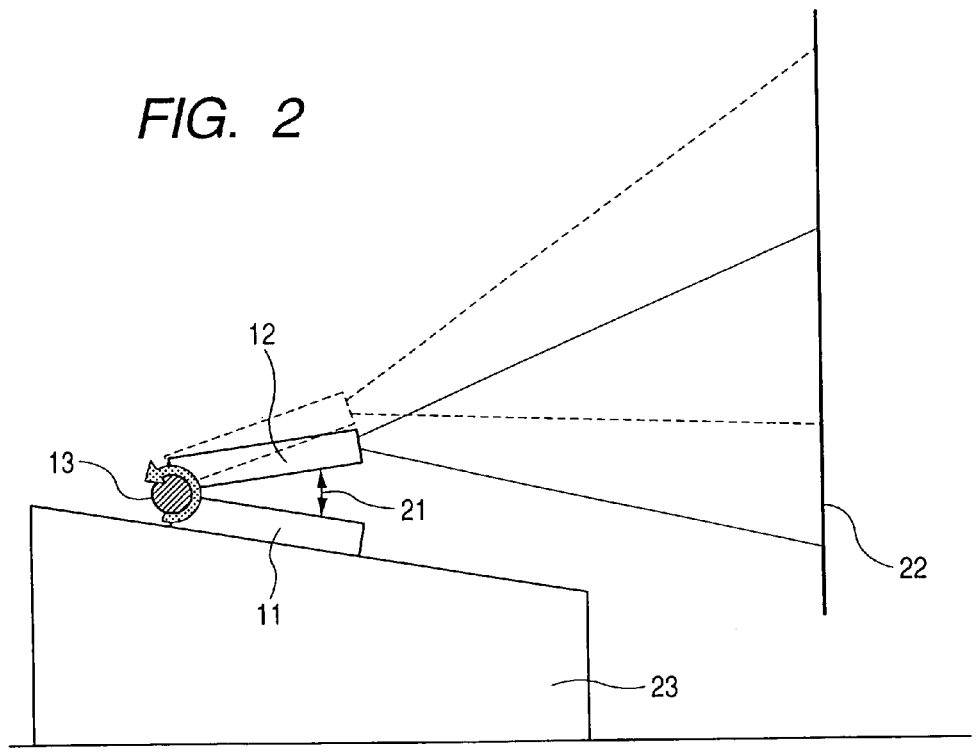
FIG. 2 is a schematic view showing a video projection apparatus according to the first embodiment of the present invention at video projection.

In this embodiment, the pivot connection portion 13 is rotated to change the orientation of the head portion 12, so that a display position (projection angle) of an image projected onto a screen surface 22 freely changes as shown in FIG. 2. Therefore, even when the video projection apparatus is placed on a sloped stage 23 as shown in FIG. 2, the image can be projected to a wall surface, a ceiling, or the like over the stage. For example, a video is projected to the wall surface in normal use and projected to the ceiling by directing the head portion 12 in the vertical direction during a bedtime of a user. Thus, the projection direction is easy to significantly change.

Figure 3:
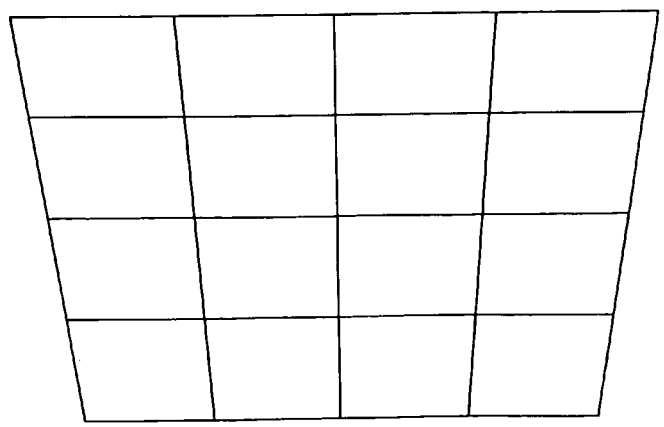
FIG. 3 is a schematic view showing keystone distortion caused at oblique projection.

When the projection direction of the image from the head portion 12 is not orthographic projection as shown in FIG. 2, trapezoidal distortion (keystone distortion) as shown in FIG. 3 occurs in the projected image. According to a known method, an image signal is converted so as to correct the keystone distortion, thereby obtaining an image having no distortion. The keystone distortion depends on a rotational angle 21 of the pivot connection portion 13. Therefore, the rotational angle 21 is detected by the rotational angle detecting means 111a incorporated in the pivot connection portion 13. The keystone distortion is automatically corrected by a distortion correcting means based on the rotational angle 21 obtained by the rotational angle detecting means 111a. At this time, whether or not the keystone distortion is corrected is determined based on the rotational angle 21 by a determination means. For example, when the rotational angle 21 is equal to or smaller than 45 degrees, projection to the wall surface is confirmed and the keystone distortion is automatically corrected. When the rotational angle 21 exceeds 45 degrees, projection to the ceiling or upward projection is confirmed and the keystone distortion is not corrected. Of course, a known system for manually correcting the keystone distortion regardless of information from the rotational angle detecting means 111a may be used. Not a method of electrically processing a video signal but a method of optically correcting distortion by the known projection optical system 19 may be used as the keystone distortion correcting method. Here, the correction of the keystone distortion is expressed. However, it is hard to completely correct the keystone distortion in actual fact. Therefore, the "correction" described here means a reduction in occurrence amount of keystone distortion (distortion amount). In addition, the keystone distortion amount caused based on a relative angle between the head portion and the main body is assumed here. However, the keystone distortion amount may be determined from a result obtained by a means for detecting an angle formed between the head portion (that is, the optical axis of the projection optical system) and the surface to be projected (normal of the surface to be projected) and the keystone distortion (keystone distortion amount) may be corrected (reduced) based on a determined result.

As described above, in this embodiment, the first portion (head portion) which is required for video projection and composed of the light source means 17, the video display means 18, and the projection optical system 19 is separated from the second portion (main body) which includes the power supplying means 15 and the video signal processing circuit 14. The first portion and the second portion are connected with each other through the rotatable connection means. Thus, the first portion pivots freely in at least one direction, so that the projection direction of the video is easy to change.

Second Embodiment

Figure 4:
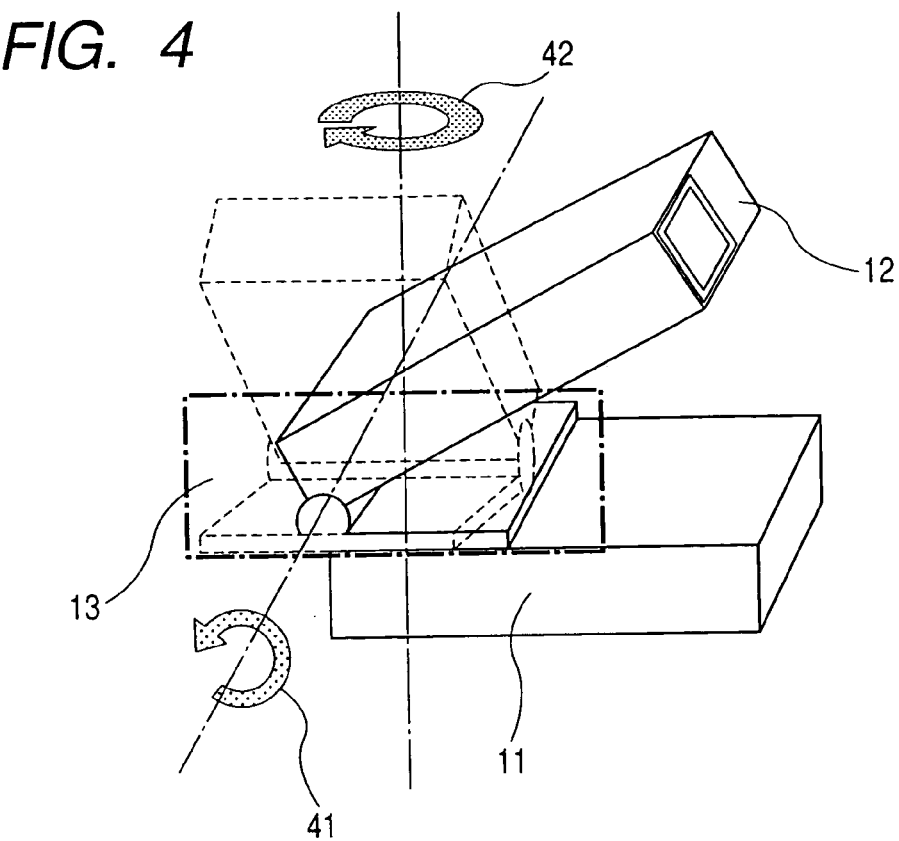
FIG. 4 is a principal part schematic view showing a second embodiment of the present invention.

FIG. 4 is a principal part perspective view showing a video projection apparatus according to a second embodiment of the present invention. In FIG. 4, the same reference numbers are assigned to elements common to those shown in FIG. 1.

In this embodiment, the connection means 13 connecting the main body 11 with the head portion 12 is rotatable in two directions, a vertical rotational direction 41 and a horizontal rotational direction 42.

For example, a state in which the main body 11 and the head portion 12 are folded is set to 0 degree. A permissible rotational angle about the vertical rotational direction 41 is set in a range of 0 degree to 90 degrees. A permissible rotational angle about the horizontal rotational direction 42 is set in a range of −180 degrees to 180 degrees. Therefore, in the video projection apparatus, it is possible to project the video to all locations such as the wall surface and the ceiling without the movement of the main body 11.

Figure 5:
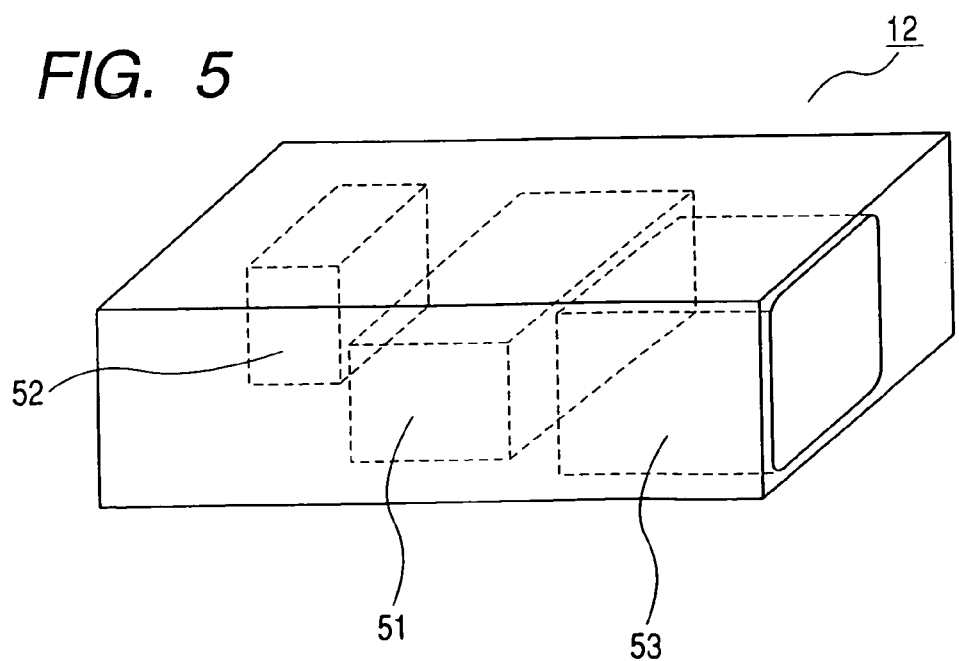
FIG. 5 a schematic view showing a structure of a head portion in the second embodiment of the present invention.
Figure 6:
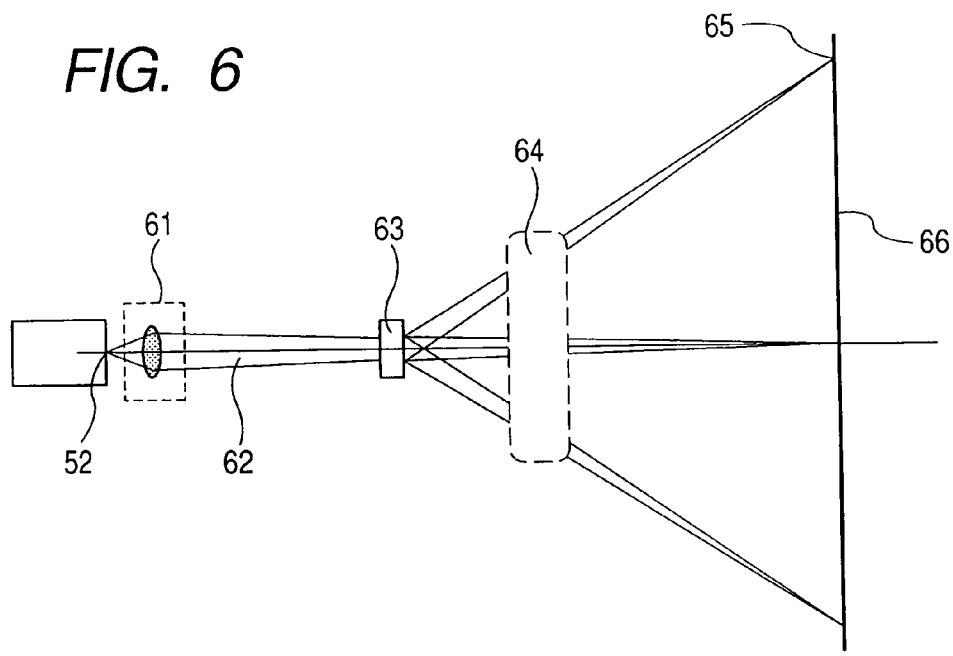
FIG. 6 shows a structural example of an optical system of a scanning display system.

The head portion 12 in the second embodiment will be described with reference to FIG. 5. A scanning display system is mounted in the head portion 12. The scanning display system includes a laser light source (light source means) 52 composed of a semiconductor laser for emitting laser light modulated based on image information, a scanning means 51 for two-dimensionally scanning a predetermined surface with a light flux from the laser light source 52, and a scanning optical system 53 for projecting a scanning light flux onto an arbitrary surface. Here, various known systems can be applied to the scanning display system. For example, it is possible to apply a scanning video projection means substantially identical to the scanning video projection apparatus as proposed in Japanese Patent Application Laid-open No. H07-151995 or Japanese Patent Application Laid-open No. 2003-029182. FIG. 6 shows a structural example of the scanning display system applied to this embodiment. In FIG. 6, a light flux from the light source means 52 is converted into a convergent beam 62 by a condensing lens 61 and allowed to enter a scanning means 63 capable of performing scanning in two-dimensional directions. The convergent beam 62 is scanned in the two-dimensional directions by the scanning means 63. Then, a light spot 65 is formed on a projection surface (surface to be scanned) 66 by a scanning optical system 64.

Figure 7:
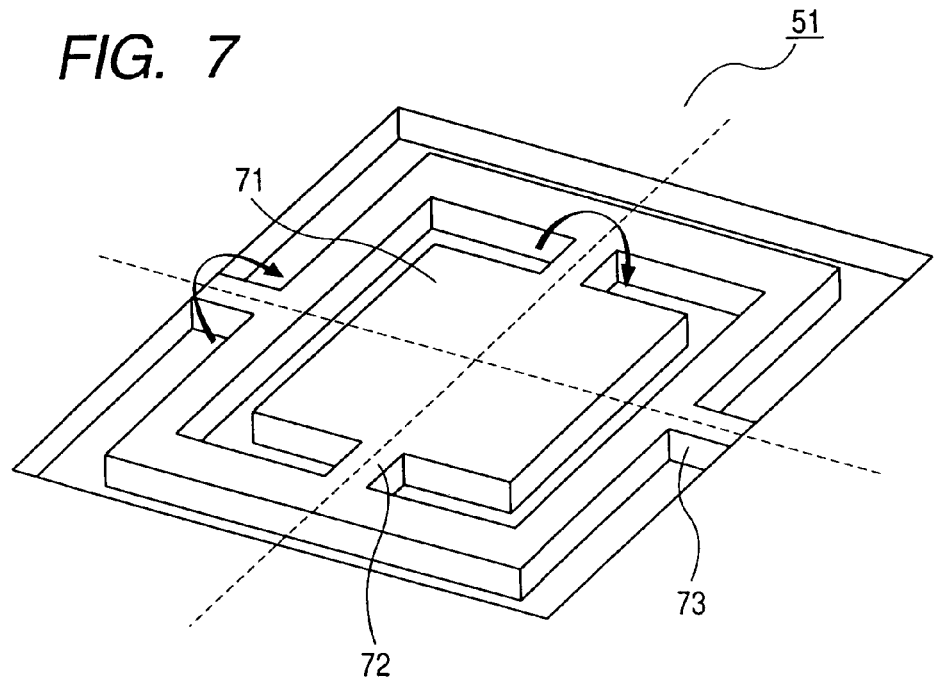
FIG. 7 shows a specific example of a scanning means used for the scanning display system.

The projection surface 66 is scanned in the two-dimensional directions with the light spot 65 to form a video on the projection surface 66. As disclosed in Japanese Patent Application Laid-open No. 2003-029182, for example, a minute vibration mirror which is composed of two torsion bars 72 and 73 and a minute mirror 71 as shown in FIG. 7 can be used as the scanning means 51. According to the minute vibration mirror, a size and weight of the head portion 12 can be reduced. When the size of the head portion 12 is reduced, it is desirable that a semiconductor laser capable of performing direct modulation without the use of an external modulator be used as the laser light source.

In FIG. 6, the scanning optical system 64 is disposed between the scanning means 63 and the projection surface 66. An optical system may be omitted between the scanning means 63 and the projection surface 66. The light flux from the laser light source 52 is converted into the convergent beam and directly imaged on the projection surface 66 through the scanning means 51.

Figure 13:
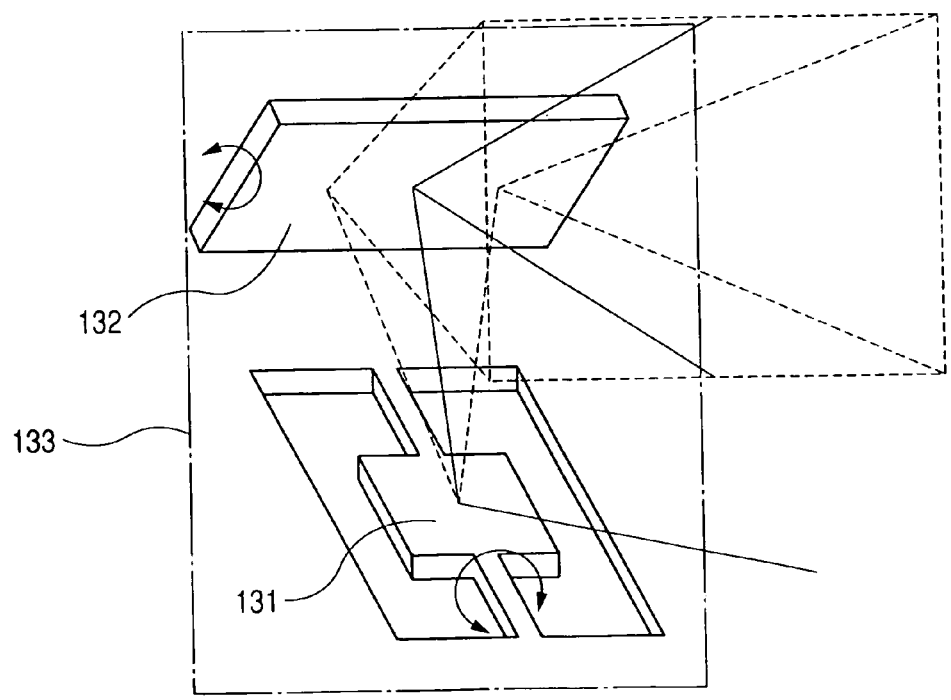
FIG. 13 shows a specific example of another scanning means used for the scanning display system.

A combination of two scanning means, such as a two-dimensional scanning means 133 as shown in FIG. 13 may be used as the scanning means 51 serving as a light scanning portion. The two-dimensional scanning means 133 is composed of a minute mirror 131 which can pivot or drive to deflect light only in a single direction and a galvanomirror 132 that oscillates only in a single direction.

A scanning system composed of a rotary polygon mirror and an oscillating mirror may be used as the light scanning portion.

Figure 8:
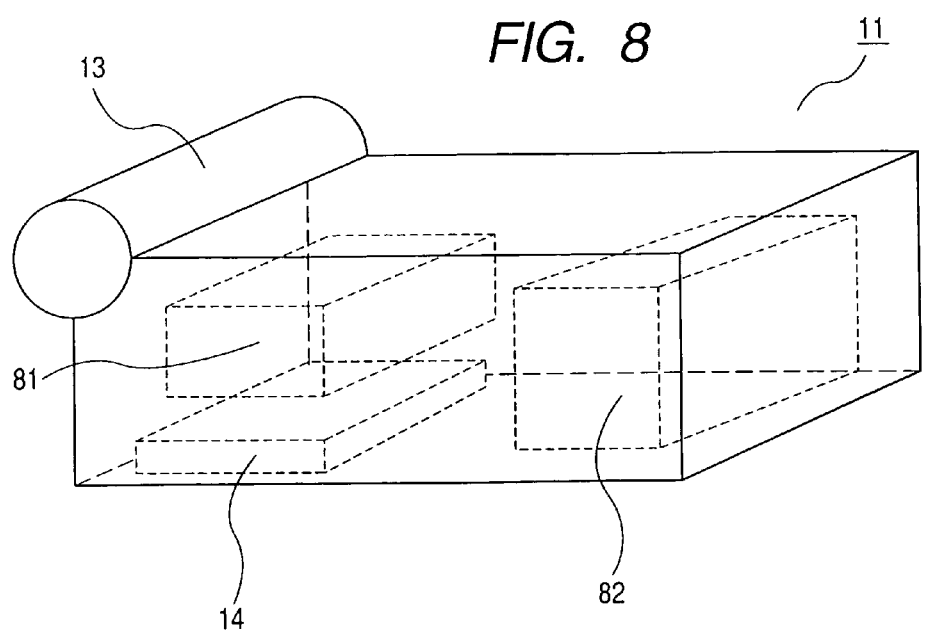
FIG. 8 is a structural schematic view showing a main body in the second embodiment of the present invention.

FIG. 8 is a schematic view showing the main body 11 in the second embodiment. The main body 11 is provided with the video signal processing circuit 14, a video storing means 81, and a power source means (power supplying means) 82.

The video storing means 81 is a small size storage medium such as a flash memory or a hard disk and stores a video to be displayed. The video stored in the video storing means 81 is converted into a video signal suitable for display on a scanning display by the video signal processing circuit 14. The video signal is displayed on the scanning display or projected onto an arbitrary surface. Of course, a video signal may be supplied from the outside of the main body 11.

The power source means 82 is a charging type battery cell such as a lithium ion battery and supplies necessary power to the video signal processing circuit 14, the laser light source 52, and the scanning means 51. The power source means 82 is charged by power supply from, for example, a home power source. Of course, a commercially available dry battery which is not a charging type, or the like may be used as the light source means 82.

Figure 9:
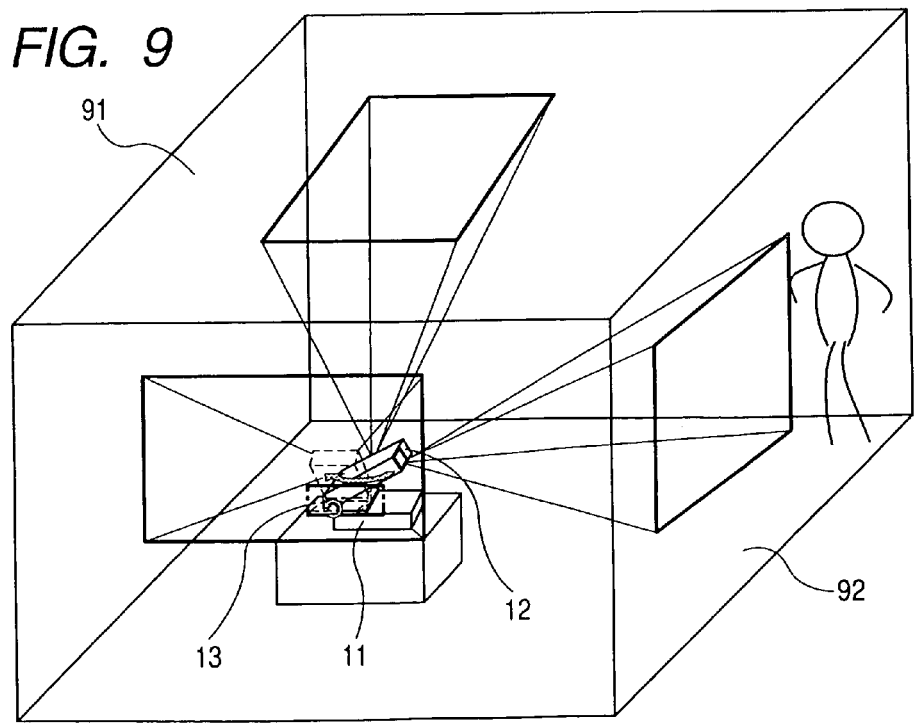
FIG. 9 is a schematic view showing a video projection apparatus according to the second embodiment of the present invention at video projection.

In this embodiment, the head portion 12 two-dimensionally moves, so that the projection direction of the video is easier to change than the first embodiment. FIG. 9 is a schematic view showing that the projection direction of the video can be freely changed by the video projection apparatus according to this embodiment. As shown in FIG. 9, the head portion 12 moves in the two rotational directions 42 and 43 of the connection means 13 which is two-dimensionally rotatable. Therefore, the projection direction of the video is freely changed regardless of a set situation of the main body, so that the video can be projected to a location convenient for a user, such as a ceiling 91 or a wall surface 92. Of course, when the entire apparatus is placed on a stage or the like, the video can be also projected onto a floor, a desk, or the like.

When a scanning video display means is used as the video display means, a size of the entire apparatus can be reduced. When a battery is incorporated as the power source means 82, the entire apparatus can be also carried to project the video onto an arbitrary surface at a free indoor or outdoor location.

For the correction of the keystone distortion, two rotational angle detecting means are incorporated in the connection means 13 as in the first embodiment. The correction is automatically performed based on a detected angle. Of course, a video signal may be manually changed to correct the distortion.

As described above, according to this embodiment, the scanning video projection means is used for video projection. Therefore, the size and weight of the first portion can be reduced. Thus, the first connection portion can be freely moved without providing a load on the connection means.

When correction means for correcting distortion caused due to a change in projection direction of the video is used, a high quality image can be always provided. When the semiconductor laser is used as the light source means for the scanning video projection means, the size of the first portion is further reduced. When the battery is used as the power supplying means, the video projection apparatus can be freely carried to project the video onto an arbitrary surface anywhere.

Third Embodiment

Figure 10:
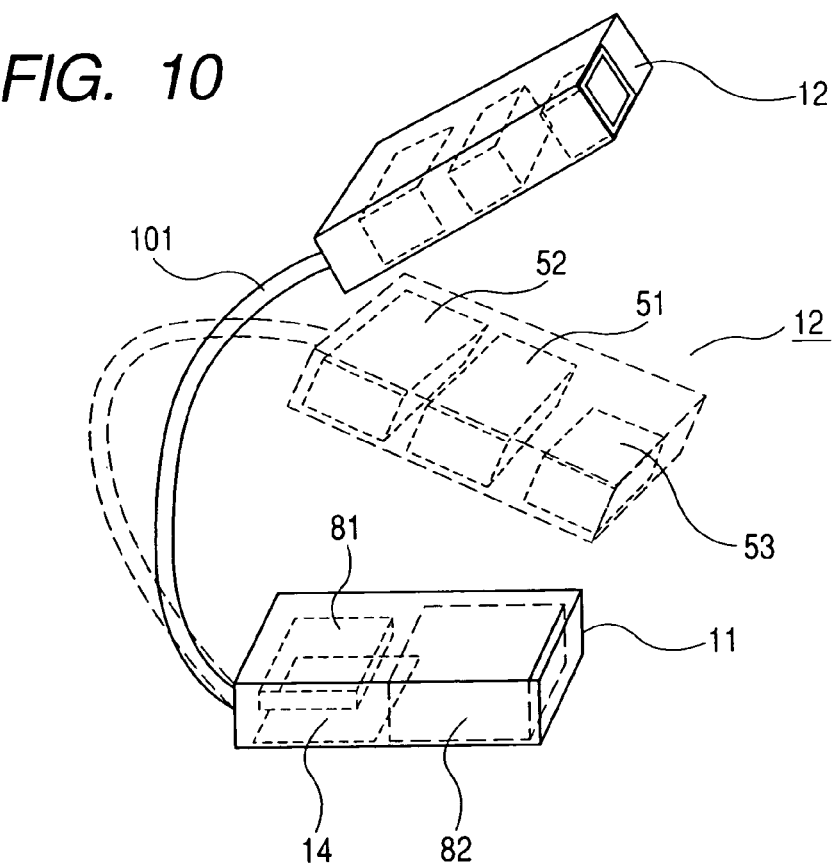
FIG. 10 is a schematic view showing a third embodiment of the present invention.

FIG. 10 is a principal part schematic view showing a video projection apparatus according to a third embodiment of the present invention.

In this embodiment, a flexible joint 101 which can be driven in an arbitrary direction is used as the connection means for connecting the main body 11 with the head portion 12. The head portion 12 can face in a free direction by the flexible joint 101, so that the video projection direction can be freely set. The main body 11 is identical to that in the second embodiment.

Figure 11:
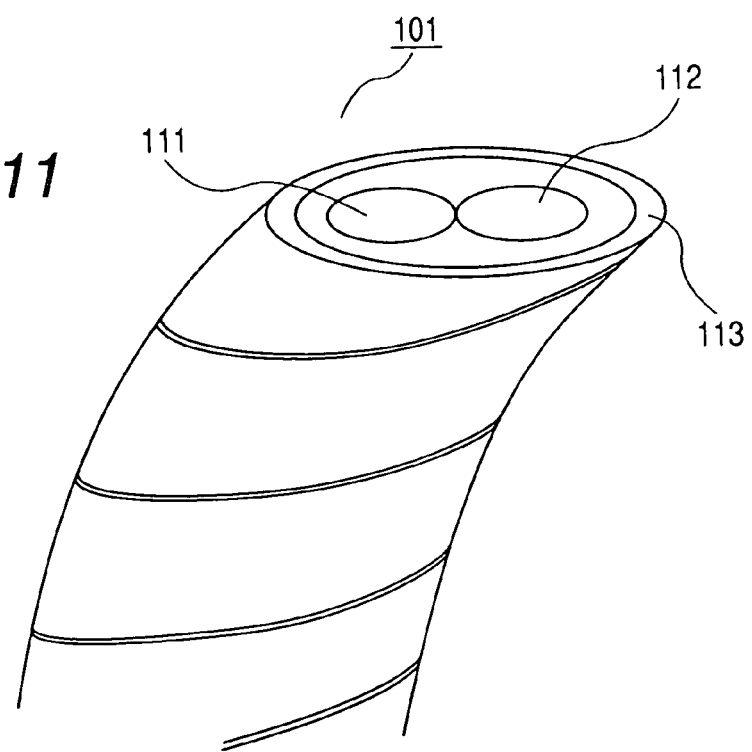
FIG. 11 is a structural view showing a flexible joint in the third embodiment of the present invention.
Figure 12:
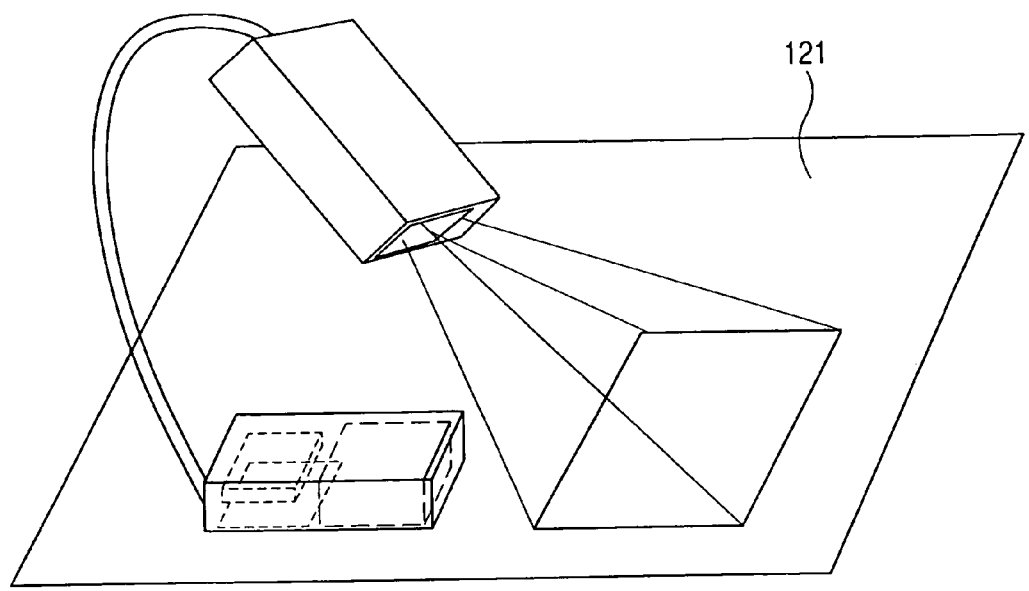
FIG. 12 is a schematic view showing a video projection apparatus according to the third embodiment of the present invention at video projection.

FIG. 11 is a schematic view showing the flexible joint 101 in this embodiment. As shown in FIG. 11, the flexible joint 101 contains a cable 111 for transmitting a video signal from the video signal processing circuit 14 and a cable 112 for transmitting drive power from the power source means 82. The cables 111 and 112 are surrounded with a flexible tube 113 having flexibility with which it is easy to bend by hand and rigidity with which the head portion 12 is sufficiently supported. The head portion 12 is lightly supported as compared with the main body 11 (is supported at ⅓ to ¼ as compared with the main body 11) by the flexible tube 113. The head portion 12 is connected with the flexible tube 113 extending from the main body 11 and held in the air by the flexible tube 113. The head portion 11 is held in an arbitrary direction by operation such as bending or torsion, of the flexible tube 113, with the result that the video projection direction can be freely determined. In particular, in this embodiment, the main body 11 and the head portion 12 can be separated from each other. Therefore, for example, as shown in FIG. 12, it is also easy to project an image onto a stage on which the main body 11 is placed, such as a desk.

For the correction of keystone distortion caused by a change in projection direction, a detection means for detecting the orientation of the head portion 12, an angle, and the like is provided in the head portion 12. A video signal is adjusted for automatic correction based on a signal from the detection means. Of course, the video signal may be manually adjusted to correct the distortion.

In the first to third embodiments, the video signal processing circuit and the power supplying means are located in the main body. Of course, the entire video signal processing circuit or a part thereof may be located in the head portion. Alternatively, the video signal processing circuit and the power supplying means may be separately located in the main body and the head portion, respectively.

As described above, according to the respective embodiments, the connection means 13 rotatable in at least one direction is provided between the head portion 12 and the main body 11. Therefore, the image can be easily projected in an arbitrary direction regardless of a set situation of the main body 11, the orientation thereof, and the like. The scanning display system is used for the video projection means, so that it is possible to reduce the size of the head portion 12, lighten a load to the connection portion 13, and freely change the projection direction. The keystone distortion caused by oblique incidence of the video relative to the projection surface is automatically corrected based on information from the rotational angle detecting means for detecting a tilt of the head portion 12 relative to the main body 11, which is incorporated in the connection means or the head portion 12. Therefore, an image having no distortion can be projected in an arbitrary direction. The semiconductor laser is used as the light source means for the scanning display, so that the size of the first portion is further easily reduced. The battery is incorporated in the main body, with the result that the entire video projection apparatus can be freely carried for projection at a free location.

The above-mentioned embodiments can be used by being arbitrarily combined with each other within a consistent scope. For example, the video display means such as the liquid crystal panel may be combined with the structure of the third embodiment using the flexible tube. Of course, the conditional expression of 1.5<W2/W1<3 described in the first embodiment may be also applied to the second and third embodiments. The expressions related to L1 and L2 may be similarly applied.

In the embodiments of the present invention, a combination of a light source (no directivity) and the video display means such as the liquid crystal panel or a combination of a light source having directivity (light source which can be modulated, such as a laser light source) and means for two-dimensionally scanning the surface to be projected is referred to as the "light modulation system".

According to the embodiments of the present invention, it is possible to achieve a video projection apparatus capable of easily projecting the video in an arbitrary direction.

This application claims priority from Japanese Patent Application No. 2003-425568 filed Dec. 22, 2003, which is hereby incorporated by reference herein.

What is claimed is:

1. An image projection apparatus, comprising:
   a light modulation system;
   a projection optical system for projecting a two-dimensional image onto a surface to be projected with light from the light modulation system;
   image signal processing means for supplying an image signal to the light modulation system;
   a power supplying portion for supplying power to the light modulation system;
   a head portion that contains the projection optical system;
   a main body portion that contains the power supplying portion; and
   a drive connection portion for connecting the head portion with the main body portion, in which the head portion and the main body portion can be relatively rotationally driven about a rotational axis which is not in parallel with an optical axis of the projection optical system,
   wherein a position onto which the light from the light modulation system is projected is changed by varying a relative angle in the rotational direction about the rotational axis between the head portion and the main body.

2. An image projection apparatus, comprising:
   a light modulation system;
   a projection optical system for projecting a two-dimensional image onto a surface to be projected with light from the light modulation system;
   image signal processing means for supplying an image signal to the light modulation system;
   a power supplying portion for supplying power to the light modulation system;
   a head portion that contains the projection optical system;
   a main body portion that contains the power supplying portion; and
   a drive connection portion for connecting the head portion with the main body portion, in which the head portion and the main body portion can be relatively rotationally driven about a first rotational axis and about a second rotational axis which is different from the first rotational axis.

3. An apparatus according to claim 1, further comprising a cable portion for electrically connecting the head portion with the main body portion.

4. An apparatus according to claim 1, wherein the light modulation system comprises a light source and at least one image forming element illuminated with light from the light source.

5. An apparatus according to claim 4, wherein the at least one image forming element comprises a plurality of pixels which are arranged in one of a two-dimensional form and a one-dimensional form.

6. An apparatus according to claim 1, further comprising means for storing at least one of an image and an image signal which is sent to the image signal processing means.

7. An apparatus according to claim 1, wherein the rotational axis is orthogonal to the optical axis of the projection optical system.

8. An apparatus according to claim 3, wherein the rotational axis is orthogonal to an optical axis of the projection optical system.

9. An apparatus according to claim 2, wherein the first rotational axis and the second rotational axis are not in parallel with an optical axis of the projection optical system.

10. An image projection apparatus, comprising:
    a light modulation system;
    a projection optical system for projecting a two-dimensional image onto a surface to be projected with light from the light modulation system;
    image signal processing means for supplying an image signal to the light modulation system;
    a power supplying portion for supplying power to the light modulation system;
    a head portion that contains the projection optical system;
    a main body portion that contains the power supplying portion; and
    a drive connection portion for connecting the head portion with the main body portion, in which the head portion and the main body portion can be relatively rotationally driven about a rotational axis which is orthogonal to an optical axis of the projection optical system,
    wherein a position onto which the light from the light modulation system is projected is changed by varying a relative angle in the rotational direction about the rotational axis between the head portion and the main body.

* * * * *